United States Patent
Dasgupta et al.

(10) Patent No.: US 11,537,440 B2
(45) Date of Patent: Dec. 27, 2022

(54) INFRASTRUCTURE ADAPTIVE CONSISTENCY LEVEL MECHANISM

(71) Applicant: Hewlett Packard Enterprise Development LP, Houston, TX (US)

(72) Inventors: Subhajit Dasgupta, Austin, TX (US); Charles E. Fowler, Fort Collins, CO (US); Michelle Frolik, Houston, TX (US); Charles Greenidge, Fort Collins, CO (US); Jerry Harrow, Brookline, NH (US); Sandesh V. Madhyastha, Bangalore Karnataka (IN); Clifford A. McCarthy, Plano, TX (US); Abhay Padlia, Bangalore Karnataka (IN); Rajeev Pandey, Corvallis, OR (US); Jonathan M. Sauer, Milpitas, CA (US); Geoffery Schunicht, Houston, TX (US); Latha Srinivasan, Milpitas, CA (US); Gary L. Thunquest, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 369 days.

(21) Appl. No.: 16/720,395

(22) Filed: Dec. 19, 2019

(65) Prior Publication Data

US 2021/0191773 A1    Jun. 24, 2021

(51) Int. Cl.
*G06F 9/50*    (2006.01)
*G06F 9/48*    (2006.01)
(Continued)

(52) U.S. Cl.
CPC .......... *G06F 9/505* (2013.01); *G06F 9/4837* (2013.01); *G06F 9/5022* (2013.01);
(Continued)

(58) Field of Classification Search
CPC ...... G06F 9/505; G06F 9/4837; G06F 9/5022; G06F 9/5072; G06F 9/542; G06F 11/3006; G06F 11/324; G06F 2209/508
See application file for complete search history.

(56) References Cited

U.S. PATENT DOCUMENTS

| | | | | |
|---|---|---|---|---|
| 6,691,148 B1 * | 2/2004 | Zinky | ...................... | H04L 65/80 709/227 |
| 7,720,551 B2 * | 5/2010 | Tantawi | .................. | G06F 9/505 709/200 |

(Continued)

OTHER PUBLICATIONS

NxLog Ltd., "NxLog User Guide," Sep. 26, 2019, pp. 1-1065.
Xin Zhang, "Fast Algorithms for Burst Detection," Sep. 2006, pp. 1-155, New York University, USA.

*Primary Examiner* — Benjamin C Wu
(74) *Attorney, Agent, or Firm* — Hewlett Packard Enterprise Patent Department

(57) ABSTRACT

A system to facilitate infrastructure management is described. The system includes one or more processors and a non-transitory machine-readable medium storing instructions that, when executed, cause the one or more processors to execute an infrastructure management controller to receive first monitoring data indicating a first infrastructure condition occurring at an on-premise infrastructure controller, determine a first load state of the on-premise infrastructure controller based on the first infrastructure condition and adjust a consistency level of the on-premise infrastructure controller to a first level of the consistency based on the first state.

20 Claims, 10 Drawing Sheets

(51) Int. Cl.
  *G06F 11/30* (2006.01)
  *G06F 11/32* (2006.01)
  *G06F 9/54* (2006.01)

(52) U.S. Cl.
  CPC ............ *G06F 9/5072* (2013.01); *G06F 9/542* (2013.01); *G06F 11/3006* (2013.01); *G06F 11/324* (2013.01); *G06F 2209/508* (2013.01)

(56) References Cited

U.S. PATENT DOCUMENTS

| | | | |
|---|---|---|---|
| 8,584,128 B1* | 11/2013 | Don | G06F 11/3442 718/103 |
| 9,189,423 B2 | 11/2015 | Hsu | |
| 9,535,776 B2 | 1/2017 | Klose | |
| 9,588,816 B2* | 3/2017 | Zhu | H04L 43/0876 |
| 10,970,269 B2* | 4/2021 | Raman | G06F 16/2272 |
| 2004/0181476 A1* | 9/2004 | Smith | H04L 29/06 705/35 |
| 2011/0238458 A1* | 9/2011 | Purcell | G06F 9/5072 709/204 |
| 2012/0131181 A1* | 5/2012 | Birkler | G06F 9/5083 709/224 |
| 2012/0331113 A1* | 12/2012 | Jain | H04L 67/1008 709/220 |
| 2013/0138876 A1 | 5/2013 | Wang | |
| 2015/0324134 A1* | 11/2015 | Sendelbach | G06F 12/122 710/313 |
| 2017/0219241 A1 | 8/2017 | Magcale et al. | |
| 2021/0377780 A1* | 12/2021 | Wang | H04W 24/04 |

\* cited by examiner

Input:
* Compute: 2 DL's
* Connection to: Network A
* Private network between
* Shared storage between Output on "can I create?" Query:
* status yes
* "cost" (i.e. what resources would be consumed Output on creation:
* Status created
* DL1 [MAC 1A, MAC 1B, MAC SAN1]
* DL2 [MAC 2A, MAC 2B, MAC SAN2]
* Shared Storage [URI]

| C1 | C2 | C3 | C4.1/C4.2 | C5 |
|---|---|---|---|---|
| 0.25 | 1.29 | 0.77 | 2/1981 | 11726 |

- C1 – load avg for 1 min, using last 12 readings
- C2 – load avg for 5 min, using last 60 readings
- C3 – load avg for 15 min, using last 180 readings
- C4.1/C4.2 – currently executing proc, threads/ currently exist on the system
- C5 – recently created process PID
- Reading /proc/loadavg
- C1 – only 25 % load
- C2 – 29% overload
- C3 – only 77% load

FIG. 7B

INFRASTRUCTURE ADAPTIVE CONSISTENCY LEVEL MECHANISM

BACKGROUND

A cloud service may refer to a service that includes infrastructure resources (a compute resource, a storage resource, a networking resource, etc.) connected with each other and/or platforms. Such infrastructure resources can collectively be referred to as "cloud resources." A host (also referred to as a cloud service provider) may, as example, provide Software as a Service (SaaS) by hosting applications or other machine-readable instructions; Infrastructure as a Service (IaaS) by hosting equipment (servers, storage components, network components, etc.); or a Platform as a Service (PaaS) by hosting a computing platform (operating system, hardware, storage, and so forth).

A hybrid cloud is a public and/or private cloud environment at which IaaS or PaaS is offered by a cloud service provider. The services of the public cloud may be used to deploy applications. In other examples, a hybrid cloud may also offer SaaS, such as in examples where the public cloud offers the SaaS as a utility (e.g. according to a subscription or pay as you go model). Hybrid clouds implement virtualization technology to deploy a virtual infrastructure based on native hardware. Virtualization technology has typically been employed via virtual machine (VMs), with each application VM having a separate set of operating system, networking and storage.

BRIEF DESCRIPTION OF THE DRAWINGS

In the following drawings like reference numbers are used to refer to like elements. Although the following figures depict various examples, one or more implementations are not limited to the examples depicted in the figures.

FIG. 7B illustrates one embodiment of load averages.

DETAILED DESCRIPTION

Figure 1:
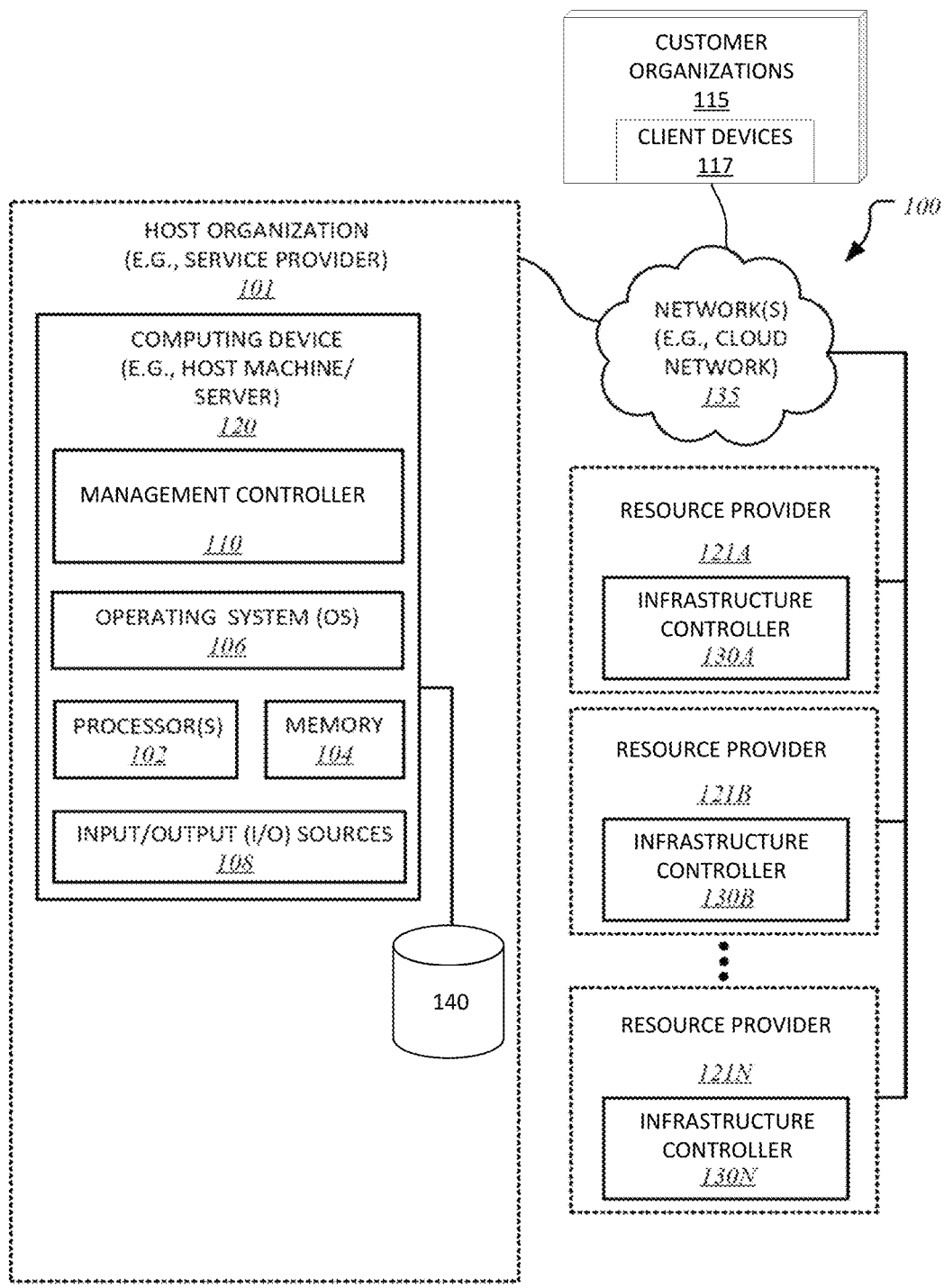
FIG. 1 illustrates one embodiment of an infrastructure management system.

In embodiments, an infrastructure management platform is provided to facilitate infrastructure management services between a client organization and one or more infrastructure resource provider organizations.

Currently, management of infrastructure resources is provided by on-premise infrastructure controllers. However, these infrastructure controllers only have a capability of controlling resources that are physically on-premise (e.g., within the same data center). Such a configuration precludes the management of resources at multiple sites via a single controller.

According to one embodiment, a cloud micro-service controller is implemented to control all resources within an infrastructure management platform. In a further embodiment, the micro-service controller facilitates a dynamic adjustment of a level of consistency between a management controller and infrastructure controller, as well as an adjustment of an aging algorithm, based on load detection. In one embodiment, the management controller receives a load average from the infrastructure controller that is used to determine which of a plurality of load states in which the infrastructure controller is operating. The management controller adjusts level of consistency and the aging algorithm according to the load state. In another embodiment, the management controller adjusts timeout intervals based on the load state In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 1 illustrates one embodiment of an infrastructure management system 100 having a computing device 120 employing a management controller 110. In one embodiment, management controller 110 is a microservice that facilitates management of physical infrastructure resources provided by a plurality of infrastructure services organizations. In a further embodiment, management controller 110 enables the management of those resources on behalf of a plurality of client (or customer) organizations via a declarative description (or Blueprint) that specifies resources requested by the client. In such an embodiment, a Blueprint provides an abstract description of compute, storage, networking and OS image resources that can be allocated and configured together to operate a virtual machine (VM) cluster or software application. Accordingly, Blueprints serve as a high level description used to request an execution venue (or venue) for deployment of application workloads via management controller 110. In one embodiment, a venue may be defined as an environment at which client workloads may be executed.

As shown in FIG. 1, computing device 120 includes a host server computer serving as a host machine for employing management controller 110, which provides a platform to facilitate management of infrastructure resources on behalf of customer organizations (or clients) 115 via a PaaS or IaaS. Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 117, etc. Computing device 120 further includes processor(s) 102, memory 104, input/output ("I/O") sources 108, such as touchscreens, touch panels, touch pads, virtual or regular keyboards, virtual or regular mice, etc. In one embodiment, management controller 110 may be executed by a separate processor application specific integrated circuit (ASIC) than processor 102. In a further embodiment, management controller 110 may act out of band, and may be on a separate power rail, from processor 102. Thus, management controller 110 may operate on occasions in which processor 102 is powered down.

In one embodiment, host organization 101 may further employ a production environment that is communicably interfaced with client devices 117 at customer organizations 115 through host organization 101. Client devices 117 may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated database(s) 140 store (without limitation) information and underlying database records having customer and user data therein on to process data on behalf of customer organizations 115. In some embodiments, host organization 101 receives input and other requests from a plurality of customer organizations 115 over one or more networks 135; for example, incoming data, or other inputs may be received from customer organizations 115 to be processed using database system 140.

In one embodiment, each customer organization 115 is an entity selected from a group consisting of a separate and distinct remote organization, an organizational group within host organization 101, a business partner of host organization 101, a customer organization 115 that subscribes to cloud computing services provided by host organization 101, etc.

In one embodiment, requests are received at, or submitted to, a web server within host organization 101. Host organization 101 may receive a variety of requests for processing by host organization 101. For example, incoming requests received at the web server may specify services from host organization 101 are to be provided. Further, host organization 101 may implement a request interface via the web server or as a stand-alone interface to receive requests packets or other requests from the client devices 117. The request interface may further support the return of response packets or other replies and responses in an outgoing direction from host organization 101 to one or more client devices 117.

In one embodiment, computing device 120 may include a server computer that may be further in communication with one or more databases or storage repositories, such as database(s) 140, which may be located locally or remotely over one or more networks, such as network(s) 135 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices 117, over one or more networks, such as network(s) 135.

In one embodiment, computing device 120 may serve as a service provider core for hosting and management controller 110 as a SaaS or IaaS, and be in communication with one or more client computers 117, over one or more network(s) 135, and any number and type of dedicated nodes. In such an embodiment, host organization 101 provides infrastructure management to resources provided by resource providers 121A-121N. Resource providers 121A-121N represent separate infrastructure resource providers that offer services to provide hardware resources (e.g., compute, storage, network elements, etc.) or software resources. In a further embodiment, one or more of providers 121A-121N may provide a virtualization of its resources as a virtualization infrastructure for virtualization of its resources. In this embodiment, computing device 120 resources and/or one or more of the physical infrastructure resources provided by providers 121A-121N may be configured as one or more Point of Developments (PODs) (or instance machines), where an instance machine (or instance) comprises a cluster of infrastructure (e.g., compute, storage, software, networking equipment, etc.) that operate collectively.

According to one embodiment, each of the providers 121A-121N implement an on-premise infrastructure controller 130 to control its respective resources. In this embodiment, each infrastructure controller 130 represents an on-premise infrastructure system (e.g., data center) that provides one or more infrastructure elements (e.g., an instance of managed infrastructure) of its respective resources. In one embodiment, each infrastructure controller 130 may comprises one or more software-defined networking (SDN) controllers that provide on-premises infrastructure management of physical infrastructure resources, such as a OneView® Infrastructure Management System. However other embodiments may implement different infrastructure management systems.

Figure 2:
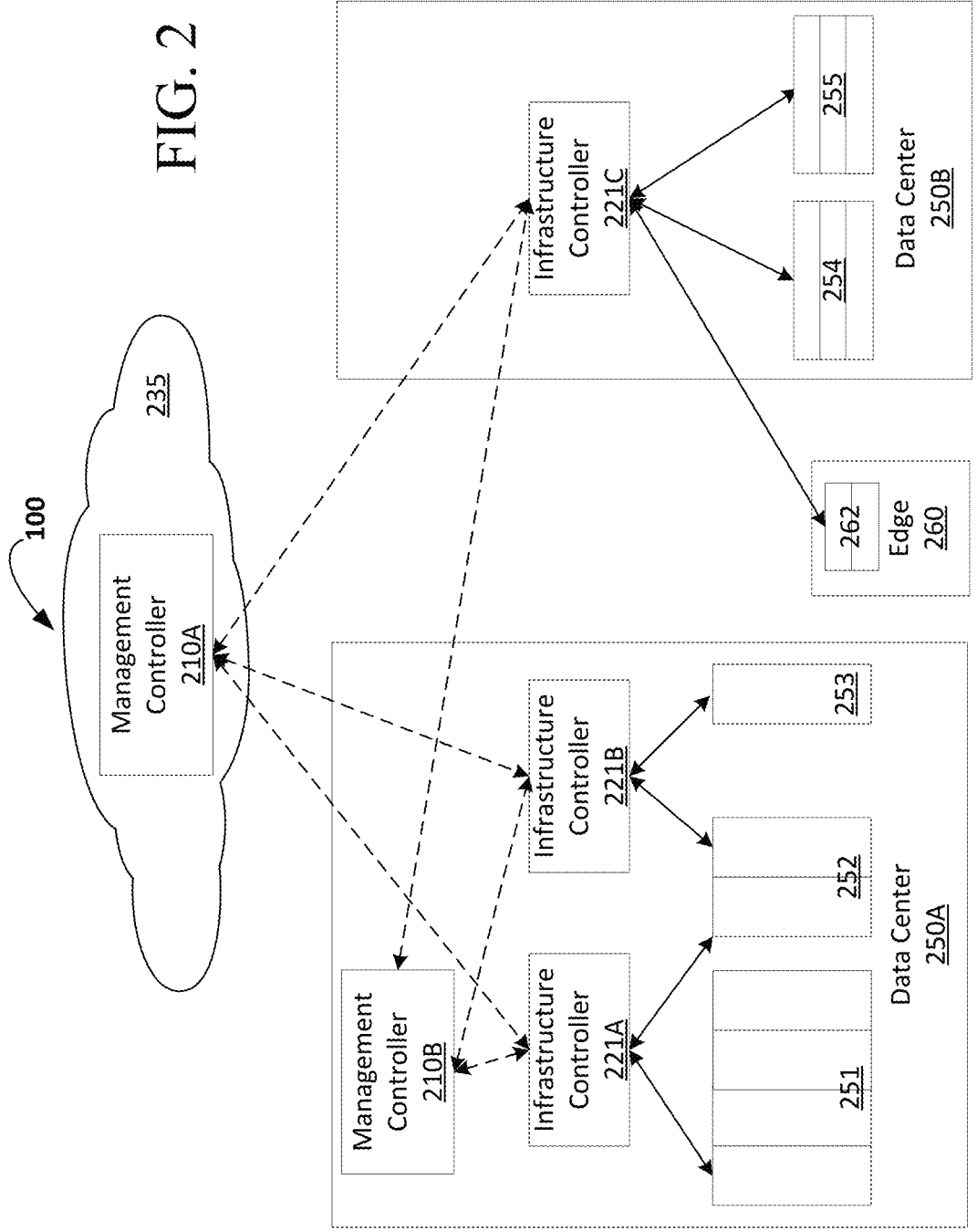
FIG. 2 is a block diagram illustrating another embodiment of an infrastructure management system.

FIG. 2 is a block diagram illustrating another embodiment of an infrastructure management system 100. As shown in FIG. 2, infrastructure management system 100 may include the management of resources within data centers or edge devices. For example, infrastructure management system 100 includes a data center 250A having resources 251-253, data center 250A having resources 254 and 255, and an edge device 260 having resources 262 (e.g., routers, routing switches, integrated access devices (IADs), multiplexers, etc.). Additionally, data center 250A includes infrastructure controllers 221A and 221B. In one embodiment, infrastructure controller 221A manages one or more resources within each of resources 251 and 252, while infrastructure controller 221B manages one or more resources within each of resources 251 and 252. Similarly, infrastructure controller 221C manages resources within each of resources 254 and 255 within data center 250B, as well as resources 262 within edge device 260.

According to one embodiment, management controllers 210 are coupled to the infrastructure controller 221. For example, management controller 210A is a cloud controller (e.g., as discussed in FIG. 1) that manages all of the resources via infrastructure controllers 221A-221C. However in other embodiments, a management controller 210 may be implemented outside of the cloud. For example, management controller 210B may be physically located in data center 250A to manage all of the resources via infrastructure controllers 221A-221C. During an initial registration of an infrastructure controller 221, a controller 221 transmits to controller 210 a full list of resources that it controls. For example, infrastructure controller 221C may inform each management controller 210 that it controls resources 254, 255 and 262.

Figure 3:
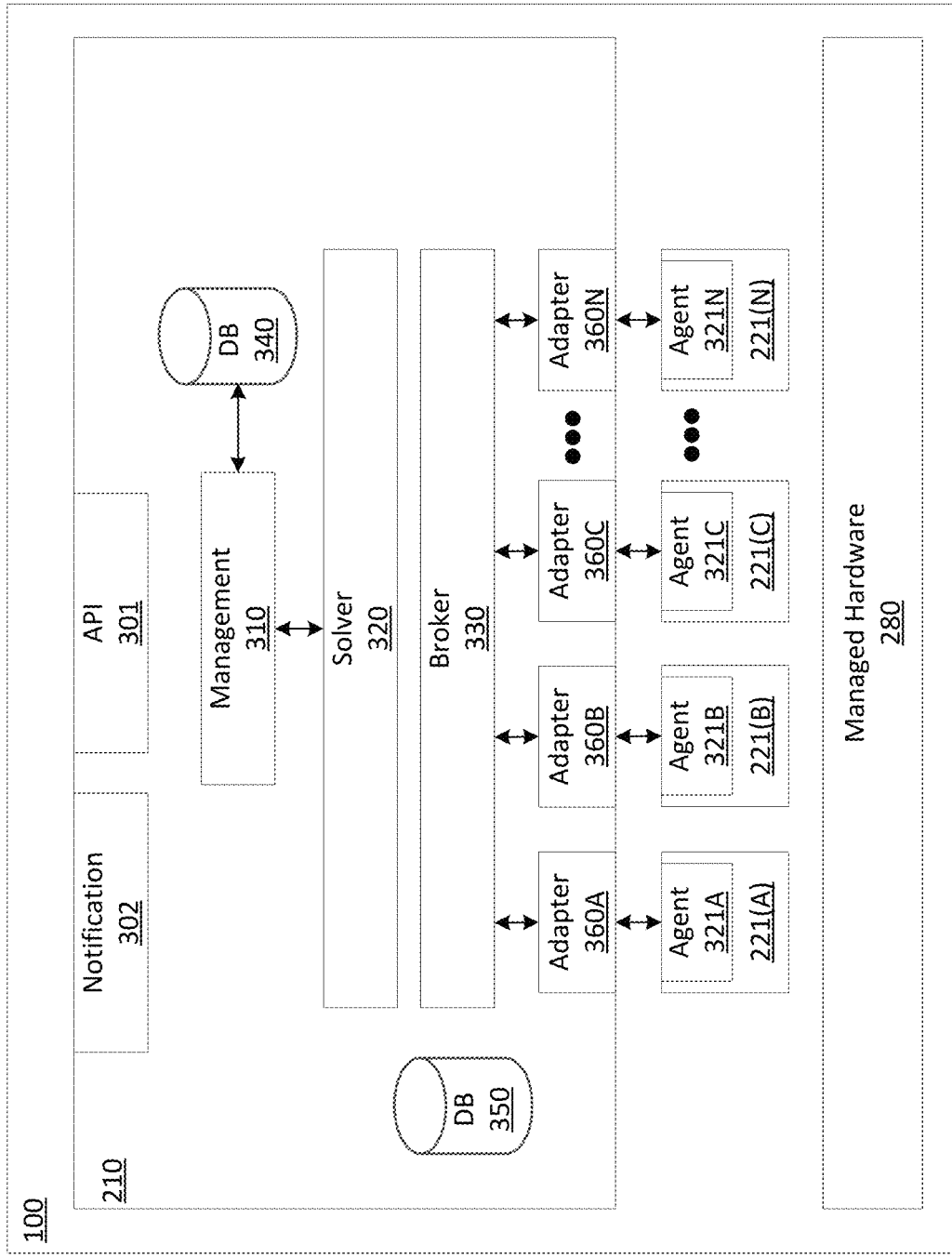
FIG. 3 illustrates yet another embodiment of an infrastructure management system.

FIG. 3 illustrates yet another embodiment of an infrastructure management system 100, including a management controller 210 and infrastructure controllers 221A-221N that directly control managed resources 280. According to one embodiment, management controller 210 includes an application programming interface (API) 301 to receive Blueprints from clients (e.g., client device 117 in FIG. 1). As discussed above, a Blueprint is an abstract description of compute, storage, networking and OS image resources to be allocated to a client as a unit of compute/venue for workload deployment. For example, a Blueprint may specify that "I want a DL server on Network A", or "I want a pair of DL servers on Network A, with a private network between them and shared storage."

Figure 4A:
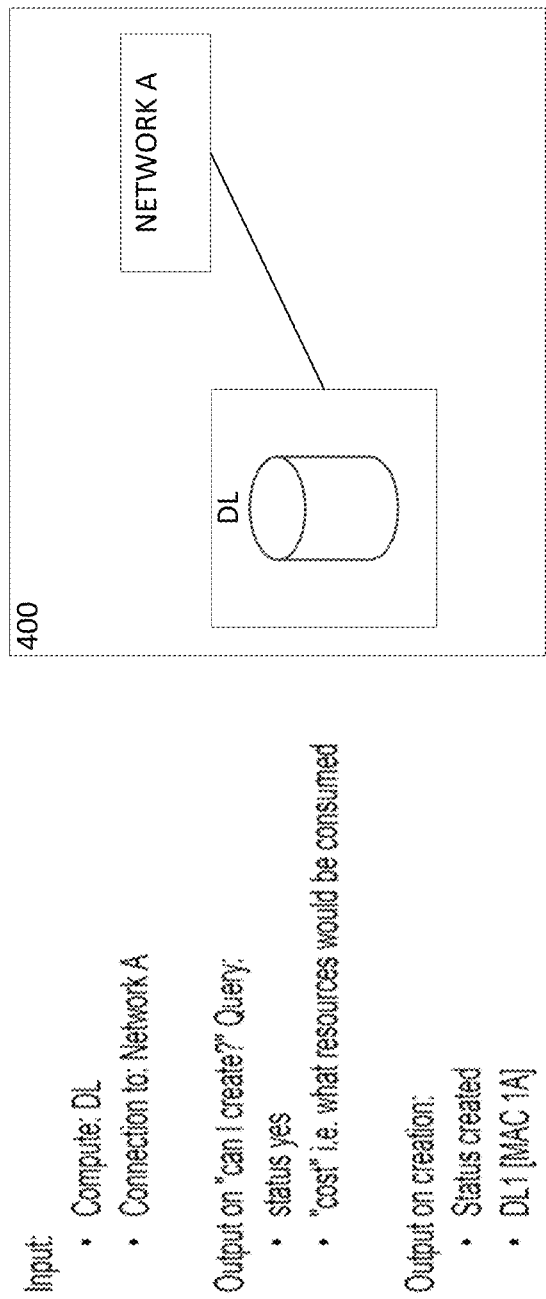
FIG. 4A and FIG. 4B illustrate embodiments of deployed infrastructure using Blueprints.
Figure 4B:
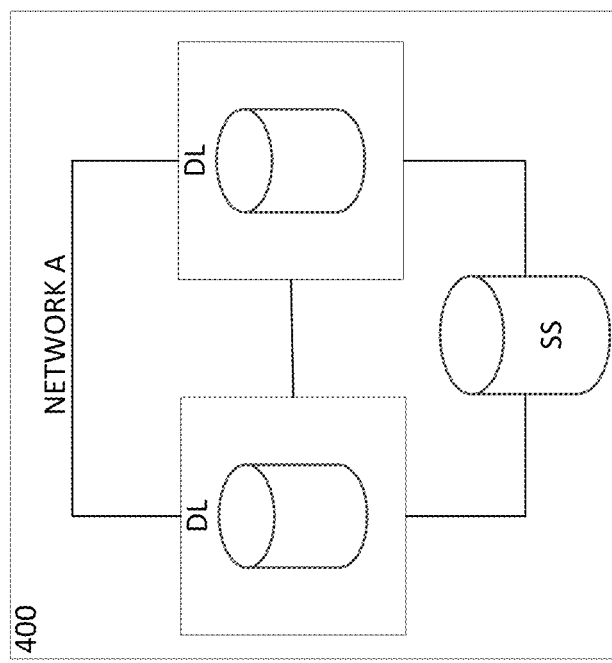

Management engine 310 receives a Blueprint via API 301 and tracks all transaction via a database 340. In one embodiment, a solver engine 320 receives the Blueprint from management engine 310 and translates the Blueprint into a set of high level steps (or Recipe) needed to instantiate the requested resources. FIG. 4A and FIG. 4B illustrate embodiments of deployed infrastructure 400 using Blueprints. As shown in FIG. 4A and FIG. 4B, the above exemplary Blueprint statements are converted to inputs and outputs, as well as an output on creation. In other embodiments, a Blueprint may include a statement to discontinue or remediate existing allocated resources.

Once the Blueprint conversion is performed, solver engine 320 creates a blueprint instance associated of the Blueprint and forwards a resource request to broker 330, which broadcasts the request to the infrastructure controllers 221. According to one embodiment, broker 330 broadcasts requests to infrastructure controllers 221 via adapters 360. In such an embodiment, each adapter 360 operates as a bridge to an infrastructure manager 221. Thus, adapters 360A-360N are implemented to interface with 221A-221N. In a further embodiment each adapter 360 is communicatively coupled to an agent 321 within an infrastructure controller 221. In this embodiment, an agent 321 operates as an on-premise component that performs functions on an infrastructure controller 221 instance on behalf of an associated adapter 360. Such functions may include actuating the infrastructure controller 221 instance to create, destroy and remediate blueprint instances.

Agents 321 may also transmit state change notifications to an adapter 360 for infrastructure elements and heartbeat. In one embodiment, received state changes are maintained at database 350. Database 350 maintains an inventory of resources provided by each infrastructure controller 221 registered with management controller 210. In a further embodiment, database 350 maintains a cache of a state function of each resource associated with an infrastructure controller 221. Thus, any change in state of resource associated with the infrastructure controller 221 is forwarded to management controller 210, where it is stored in database 350.

Sometime after broadcasting the request, broker 330 receives proposals from one or more infrastructure controllers 221. In one embodiment, a proposal indicates a request by an infrastructure manager 221 to provide all or some of the requested resources that were broadcasted. For example, upon receiving a broadcast requesting 60 server resources, infrastructure controller 221A may propose providing 30 server resources, while infrastructure controller 221B may propose providing all 60 server resources. In one embodiment, solver engine 320 receives the proposals and determines which proposal and performs a mapping that best matches the Blueprint request. Subsequently, solver engine transmits a notification to client 117 from which the Blueprint was received via a notification engine 302. In a further embodiment, solver may select two or more proposals that match the request and forward for selection by a user at client 117.

Upon acceptance of a proposal, one or more adapters 360 facilitate instantiation of a resource instance with one or more infrastructure controllers 221 that will be providing the resources. Subsequently, the infrastructure controllers 221 assign the resources internally. For example, an accepted proposal may specify that 30 server resources are to be provided by infrastructure controller 221A and another 30 server resources are to be provided by infrastructure controller 221B. Thus, adapters 360 for infrastructure controller 221A and infrastructure controller 221B assign the required resources and forwards the resource assignments back to management controller 210, where the resource assignments are stored a database 340 by management engine 310 along with the associated Blueprint and blueprint instance.

Figure 5:
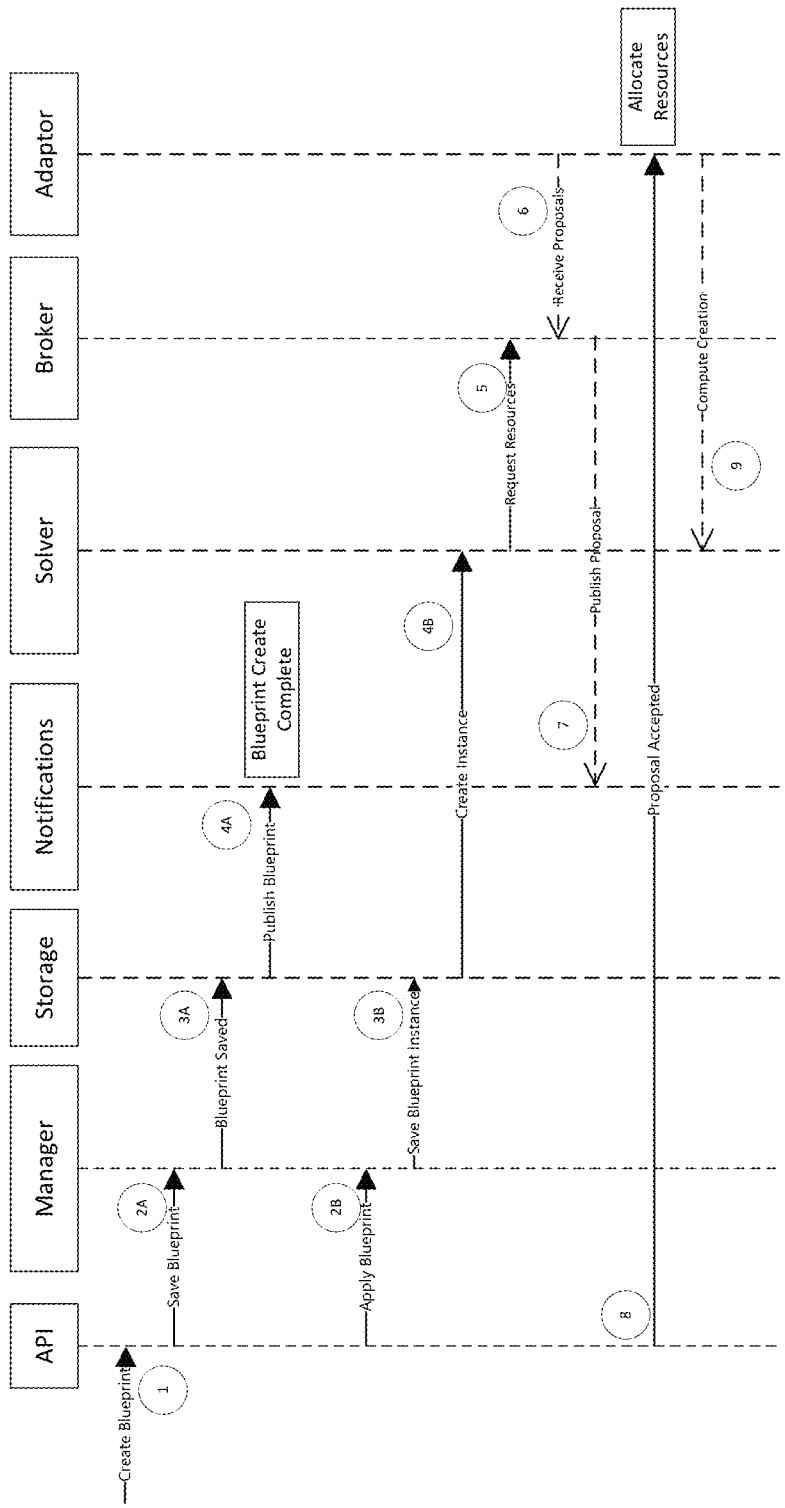
FIG. 5 illustrates one embodiment of a sequence diagram for operation of a management controller.

FIG. 5 illustrates one embodiment of a sequence diagram for operation of management controller 210. At stage 1, a Blueprint is created at API 301 (e.g., via a client). At stages 2A and 2B, the Blueprint is saved and applied at management engine 310, respectively. At stages 3A and 3B, the Blueprint and an associated Blueprint instance is saved to storage (e.g., database 350). At stages 4A and 4B, Blueprint creation is published and an instance of the request in the Blueprint is created, respectively. At this stage the Blueprint creation process has completed.

At stage 5, solver engine 320 transmits a resources request to broker 330, which subsequently broadcasts the request to infrastructure controllers 221 via adapters 360. At stage 6, proposals are received at broker 330 from the infrastructure controllers 221. At stage 7, the proposals are published via one or more notifications at notification engine 302. At stage 8, a notification indicating acceptance of the proposal is received at solver engine 320 via API 301 and forwarded to one or more infrastructure controllers 221 via adapters 360. As a result, the resources are allocated at the infrastructure controllers 221. At stage 9 a notification is received from the one or more infrastructure controllers 221 and published via notification engine 302 indicating to the client that the resources have been allocated.

Figure 6:
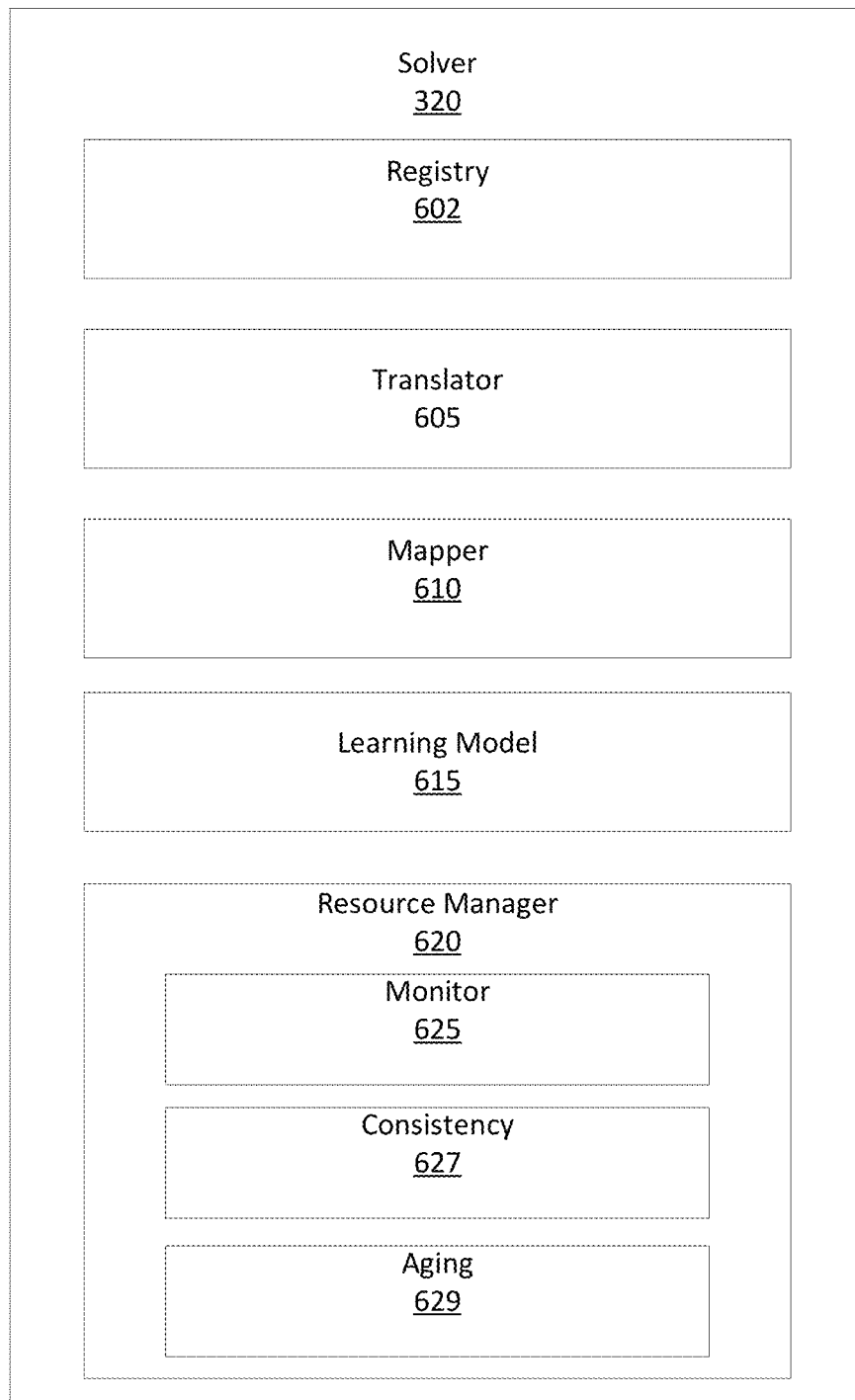
FIG. 6 is a block diagram illustrating one embodiment of a solver engine.

As discussed above, solver engine 320 performs a mapping of management controller 210 instances and infrastructure controller 221 instances. As used herein, a management controller instance includes one or more instances implemented to provision and manage resources to create and manage venues of workload deployments. As used herein, an infrastructure controller instance includes one or more instances that manages on-premise physical infrastructure. In one embodiment, the instance mapping performed by solver engine 320 provides a matching (or pairing) of instances created based on user preferences received from a client 217 to resource instances managed by an infrastructure controllers 221 via adapters 360. In this embodiment, the user preferences comprise one or more configuration parameters included in a Blueprint. FIG. 6 is a block diagram illustrating one embodiment of a solver engine 320.

As shown in FIG. 6, solver engine 320 includes a registry engine 602. In one embodiment, each infrastructure controller 221 registers with solver engine 320 via during a discovery process performed by registry engine 602 in which an infrastructure controller 221 registers. During the discovery process, an infrastructure controller 221 provides a resource capabilities listing (e.g., software and/or hardware resources managed by the infrastructure controller 221), which registry engine 602 stores in database 350. In a further embodiment, registration information may include costs (or prices charged) to use resources managed by the infrastructure controller 221.

Solver engine 320 also includes a translator 605 to translate the Blueprint configuration parameters into a Recipe comprising a set of steps having resource attributes corresponding to the configuration parameters. In one embodiment, solver engine 320 includes a compiler to translate the Blueprint into the Recipe steps. In such an embodiment, solver 320 transforms a recipe into a Blueprint using a deductive algorithm and/or extensible predefined catalogs. For example, Blueprint to Recipe translation steps can be obtained from scripts developed in advance, an extensible Blueprint catalog, or via locally computed or web delivered insights or deductions.

Solver engine 320 further includes a mapper 610 to perform the mapping (or pairing) of management controller 210 instances (or management instances) and infrastructure controller 221 instances (or resource instances). In one embodiment, mapper 610 performs the mapping based on the Recipe resource attributes translated from the Blueprint configuration parameters. In such an embodiment, mapper 610 matches resource capabilities provided by one or more infrastructure controllers 221 during registration with the resource attributes included in the Recipe.

In a further embodiment, management instances and resource instances are mapped using an m:n cardinality construct. In such an embodiment, mapper 610 maintains a set of data structures within database 340 to track management controller 210 resources (e.g., management tables) and another set of data structures to track resources associated with each infrastructure controller 221 (e.g., infrastructure tables). Accordingly, the m:n mapping provides that each row in the management tables may reference many rows in the infrastructure tables, and each row in the infrastructure tables may reference many rows in the management tables.

As discussed above, the mapping may be performed based on user configuration parameters (or criteria). In one embodiment, Blueprint configuration parameters may define one or more latency constraints. For example, the configuration parameters may indicate user preferences to ensure that latency between management controller 210 and infrastructure controllers 221 does not exceed a defined threshold value, or ensure that providers of infrastructure controllers 221 are restricted to defined geographical locations due to bandwidth considerations.

In another embodiment, Blueprint configuration parameters may define infrastructure and data locality. For instance, the configuration parameters may provide for geographical (or other locational affinity) constraints due to data locality, compliance and regulatory constraints, which is typically a consideration for security/audit administration clients. In yet another embodiment, Blueprint configuration parameters may define disaster recovery considerations (e.g., availability zones). In still another embodiment, Blueprint configuration parameters may define power (or other types of infrastructure costs) as driving factors in the matching management controller 210 and infrastructure controllers 221 instances.

Based on all of the defined Blueprint configuration parameters, mapper 610 maps available management instances to one or more infrastructure controllers 221 that satisfy the configuration parameter constraints. Thus, management controller 210 performs a search of database 350 to find the infrastructure controllers 221 having resources that satisfies the criteria, and assigns those resources to a management controller 210 instance. Subsequently, mapper 610 updates the mapping in database 340 (e.g., instance and resources used), as well of the status of the resource inventory in database 350 (e.g., resource status changed from unused to used).

According to one embodiment, solver engine 320 also implements a learning model 615 to assist in the resource mapping performed by mapper 610. In such an embodiment, learning model 615 performs a machine learning algorithm to learn customer preferences based on how clients have previously performed a manual deployment (and/or adjustment) of management controller 210 and infrastructure controller 221 instances and how they move them around afterwards. Thus, learning model 615 captures client pairing data (e.g., how often resource instances are used, modified and/or deleted) to establish suitable mappings. As a result, learning model 615 may capture anonymous data for all clients to review trends over time that can then drive individual recommendations for specific clients based on previous configurations.

In a further embodiment, solver engine 320 includes a resource manager 620 including a monitor 625 to monitor resource service conditions and automatically modify (or adjust) mappings based on those conditions. In such an embodiment, monitor 625 may initiate a monitoring process by polling an infrastructure controller 221 (e.g., via an associated agent 321 and adapter 360). In response, monitor 625 may receive a state change notification from an infrastructure controller 221 indicating a status (e.g., access of the resources has been interrupted). For example, a change notification may be received in response to a surge in infrastructure demand due to promotional offerings, or upon a regulatory occurrence (e.g., Brexit) that may change the cost dynamics of infrastructure (e.g., due to tariffs, taxes, etc.).

In a further embodiment, monitor 625 monitors the status of management and resource instances. In such an embodiment, monitor 625 may indicate whether management instances and/or resource instances are overloaded (e.g., large quantities of processing are occurring and some instances may not be able to maintain a level of consistency) and/or network latency is resulting in data delays. As defined herein, level of consistency (or consistency level) specifies an agreement with a user of system 100 (e.g., a client 217) in which there is a guarantee that access to infrastructure resources will be consistent and predictable. As a result, resource manager 620 includes a consistency model 627 to maintain a consistency level between system 100 and clients 217.

Figure 7A:
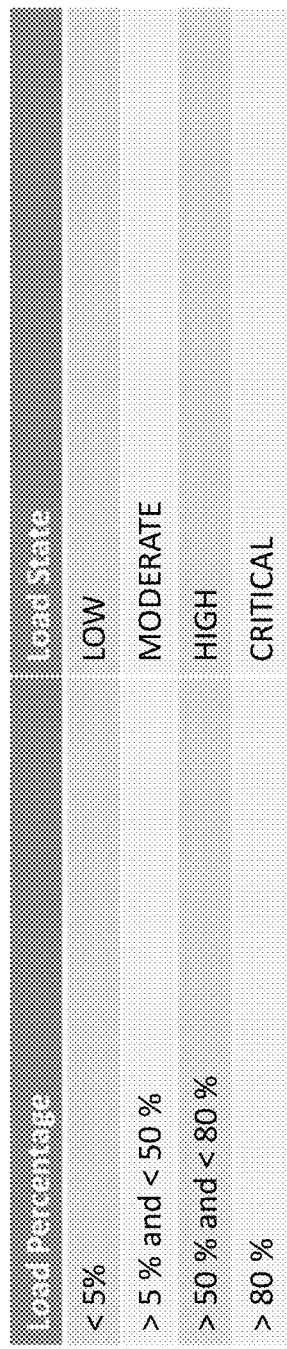
FIG. 7A illustrates one embodiment of a load state mapping.

In one embodiment, consistency model 627 may be implemented to ensure that a response is received from a resource (or appliance) within a defined time. In this embodiment, a timeout occurs upon a response not being received from an infrastructure controller 221 within the timeout interval. However, in some instances it may be not be possible to maintain the same level of consistency in all situations due to network bandwidth, appliance resource limitations, CPU/memory load, etc. According to one embodiment, consistency model 627 automatically adjusts the level of consistency that is expected to be maintained depending upon the load and network bandwidth limitations. In such an embodiment, the level of consistency is adjusted based on a load state mapping provided for an infrastructure controller 221. FIG. 7A illustrates one embodiment of a load state map.

As shown in FIG. 7A, the load state map includes load states (e.g., Low, Medium, High and Critical) associated with a respective load percentage range (e.g., <5%, >5% and <50%, >50% and <80%, and >80%). In a further embodiment, the load percentages are determined based on a load average value received from an infrastructure controller 221, where the load average value is generated by aggregating load average sampling values associated with each resource managed by an infrastructure controller 221. In this embodiment, a load average sampling value is determined from a load at a resource during pre-defined sampling intervals (e.g., 1 minute, 5 minutes, 15 minutes, etc.). FIG. 7B illustrates one embodiment of load average sampling values.

In one embodiment, the load percentage can be calculated by multiplying the load average by 100 and dividing by the quantity of hardware resources available at the appliance. In a processing resource example in which a dual core processor has 4 processors, the load percentage can be calculated as (0.25*100)/(4*2)=16.125%. The load percentage, once calculated, is compared to the load percentage ranges in the load state map to determine which range, and thus which load state, is applicable. Based on the load state, the consistency level is adjusted (e.g., reduced or increased) such that polling of the infrastructure controller 221, as well as the processing rate of data is adjusted to maintain performance and response time. Thus in an exemplary application, monitor 620 receives monitoring data from an infrastructure controller 221, which in turn monitors various appliances (e.g., servers, storage devices, etc.).

At some point infrastructure controller 221 may have to monitor a flood of events (e.g., due to all of the servers being managed by the infrastructure controller 221 being booted up after a power outage). Based on the events, the processing rate of infrastructure controller 221 slows down to handle all of the incoming traffic. As a result, the consistency level is automatically adjusted (e.g., based on a calculated load percentage indicating that the infrastructure controller 221 is operating in a Critical load state) by consistency model 627 such that the rate at which monitor 620 receives updates (e.g., events) from infrastructure controller 221 is reduced.

In other embodiments, the consistency level may be adjusted based on other infrastructure conditions, such as network latency (e.g., due to network bandwidth limitations), throughput and level of frequency of changes in data, in addition to the load of infrastructure controllers 221. Thus, updates are received at monitor 620 at a slower (or delayed) rate to enable infrastructure controller 221 to process the server events. As the infrastructure controller 221 is processing the flood of events, monitor 620 may receive updates indicating that the load average has reduced, thus resulting in consistency model 627 again adjusting the consistency level associated with a lower load level (e.g., Low, Moderate or High).

In yet another embodiment, load management controller 210 may also be affected by overload and network latency conditions. In this embodiment, level of consistency may also be adjusted based upon loads of management controller 210 instances. Similar to discussed above with regards to infrastructure controllers 221, the rate of updates are delayed to enable the management controller 210 instances to process events.

According to one embodiment, timeout intervals are also adjusted based on the current load state. Thus, defined timeout interval times may be different for each load state such that the defined timeout interval may be increased as the load state increases, and vice versa. Based on the above-example, the timeout interval is increased as the rate at which monitor 620 receives the updates is reduced. In a further embodiment, one or more messages may be transmitted to a client device 117 (e.g., via notification engine 302) upon the consistency level being adjusted. In yet a further embodiment, the messages may be displayed at a user interface at the client device 117 to provide a visualization of to communicate the reduced expectation of correctness to the user of the appliances. In this embodiment, the messages include information regarding status and/or state updates transmitted by client devices.

Resource manager 620 includes an aging engine 629 that implements an aging algorithm that is associated with a retention period of historical records. In one embodiment, aging engine 629 discards historical events (e.g., tasks, alerts, expired sessions, device health and utilization collections) to prevent running out of disk space. In such an embodiment, the aging algorithm gradually increases the priority of events that wait in the system. For example, if priority range is from 127 (low) to 0 (high), the priority of a waiting process may be increased by 1 every 15 minutes. In a further embodiment, the aging algorithm indicates that no more than 50,000 records job/operation history events or no more than 75,000 alert events are maintained. Thus, events begin to be discarded once those numbers are attained.

According to one embodiment, aging engine 629 automatically adjusts the aging algorithm to handle unexpected scenarios in which a flurry of incoming events may overwhelm the system. In this embodiment, aging engine 629 adjusts the aging algorithm based on the load state. For instance, upon monitor 625 detecting a critical state, the aging algorithm may be adjusted to indicate that no more than 10,000 records job/operation history events and/or no more than 20,000 alert events are to be maintained. In another embodiment, the aging algorithm may be adjusted so that a defined quantity (e.g., 100,000) of historical events are discarded upon detecting a particular load state (e.g., Critical state) based on age. Thus, aging engine 629 adjusts the aging algorithm associated with the retention period of historical records from a first aging algorithm associated with a first retention period based on a first load state (e.g., Low state) to a second aging algorithm associated with a second retention period based on a second load state (e.g., Critical state).

Figure 8:
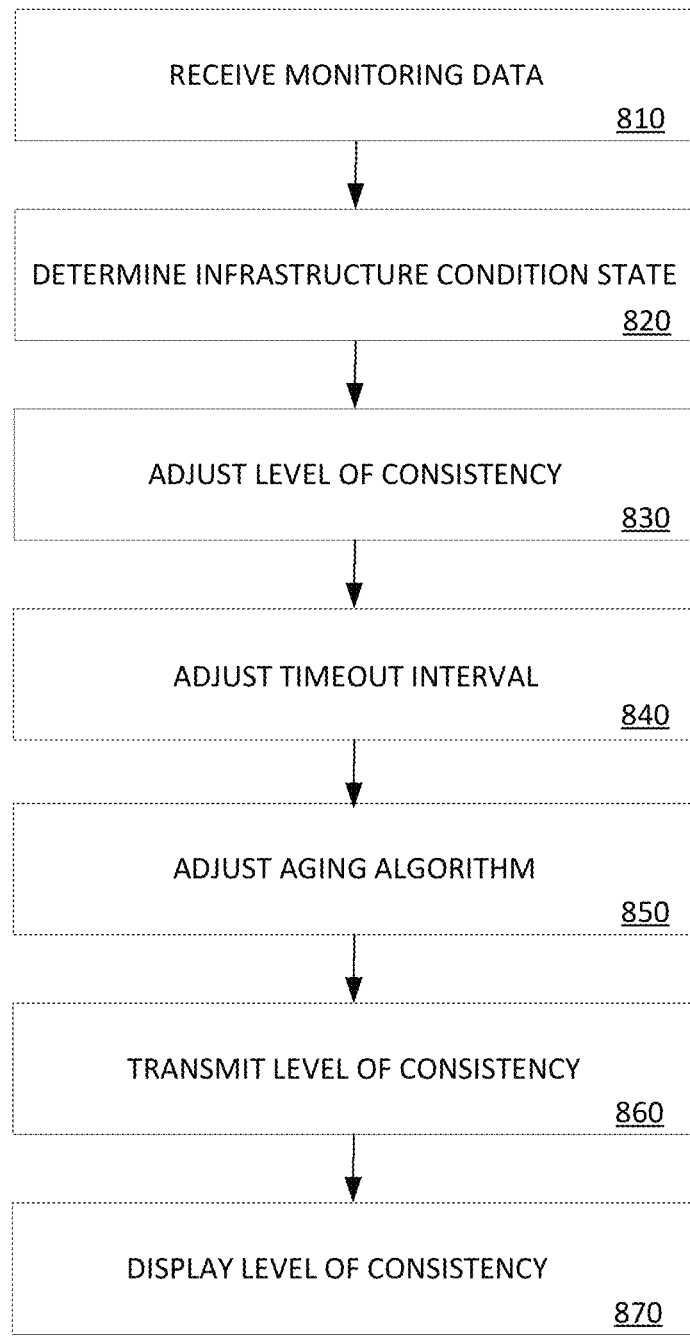
FIG. 8 is a flow diagram illustrating one embodiment of a process for adjusting a level of consistency.

FIG. 8 is a flow diagram illustrating one embodiment of a process for automatically adjusting a level of consistency. At processing block 810, monitoring data is received from an infrastructure controller 221. As discussed above, the monitoring data includes a load average occurring at the infrastructure controller 221. In one embodiment, an infrastructure condition (e.g., a determined load state, network latency, throughput, level of frequency of changes in the data, etc.) is received in response to monitor 625 polling infrastructure controller 221 for the status of resource instances. At processing block 820, an infrastructure condition state is determined. With regards to a load average infrastructure condition, a load state is subsequently determined. As discussed above, load average is used to calculate a load percentage. The calculated load percentage is subsequently compared to the load state map to determine which load state is applicable.

At processing block 830, the level of consistency of the infrastructure controller 221 is adjusted based on the infrastructure condition. For example, the consistency level may be reduced upon a determination the load state has transitioned from a lower load state (e.g., Low) to a higher load state (e.g., Critical), or may be increased upon a determination the load state has transitioned from to a higher load state (e.g., Critical) to a lower load state (e.g., High). At processing block 840, the timeout interval is adjusted based on the load state. The timeout interval may be increased upon a determination the load state has transitioned from the lower load state to the higher load state, or may be decreased upon a determination the load state has transitioned from to the higher load state to a lower load state.

At processing block 850, the aging algorithm is adjusted based on one or more infrastructure conditions. Thus, a separate aging algorithm may be implemented for two or more of the load states. As discussed above, the aging algorithm may be adjusted (e.g., from a first aging algorithm to a second aging algorithm) so that a reduced number of historical events are maintained, or a defined quantity of events are discarded, at higher load states. At processing block 860, the level of consistency is transmitted as messages to a client. At processing block 870, the messages are displayed at a user interface at the client as state and status information to provide indicators for freshness/staleness of data.

The above-described mechanisms slows the rate of processing and provides accurate expectations as to the quality of the data in an appliance with limited resources. Additionally, the mechanisms provides a dynamic handling of unexpected events to ensure that appliance management is stable.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system to facilitate infrastructure management, comprising:
one or more processors; and
a non-transitory machine-readable medium storing instructions that, when executed, cause the one or more processors to execute an infrastructure management controller to:
monitor resource service conditions at an on-premise infrastructure controller by polling the on-premise infrastructure controller;
receive first monitoring data in response to the polling indicating a first infrastructure condition occurring at the on-premise infrastructure controller;
determine a first load state of a plurality of load states of the on-premise infrastructure controller based on the first infrastructure condition, wherein each of the plurality of load states is associated with a load average range indicating a load from one or more infrastructure resources managed by the on-premise infrastructure controller;
maintain performance and response time of the on-premise infrastructure controller by adjusting an interval at which the polling is performed based on the first load state; and
adjust a consistency level of the on-premise infrastructure controller to a first level of the consistency based on the first load state.

2. The system of claim 1, wherein the infrastructure management controller receives second monitoring data indicating a second infrastructure condition occurring at the on-premise infrastructure controller, determines a second load state of the plurality of load states of the on-premise infrastructure controller based on the second infrastructure condition and adjusts the consistency level of the on-premise infrastructure controller to a second level of the consistency based on the second load state.

3. The system of claim 2, wherein the infrastructure condition comprises a load average, and determining a state comprises calculating a load percentage based on a received load average and comparing the load percentage to a state map to determine one of the plurality of load states associated with the load percentage.

4. The system of claim 3, wherein the plurality of load states comprise low, medium high and critical states.

5. The system of claim 4, wherein the infrastructure management controller adjusts a timeout interval to a first timeout interval based on the first load state and adjusts the timeout interval to a second timeout interval based on the second load state.

6. The system of claim 4, wherein the infrastructure management controller adjusts an aging algorithm associated with a retention period of historical records to a first aging algorithm based on the first load state and adjusts the aging algorithm to a second aging algorithm based on the second load state.

7. The system of claim 1, wherein the on-premise infrastructure controller controls a set of physical resources and the infrastructure management controller manages control of the set of physical resources via the on-premise infrastructure controller.

8. The system of claim 7, wherein the consistency level specifies an agreement with a system user that guarantees consistent access to the set of physical resources.

9. The system of claim 8, wherein the infrastructure management controller transmits the consistency level to a client device associated with the system user.

10. The system of claim 9, wherein the client device displays status information via a user interface providing an indication of the consistency level.

11. A non-transitory machine-readable medium storing instructions which, when executed by a processor, cause the processor to:
monitor resource service conditions at an on-premise infrastructure controller by polling the on-premise infrastructure controller the on-premise infrastructure controller;
receive first monitoring data in response to the polling indicating a first infrastructure condition occurring at the on-premise infrastructure controller;
determine a first load state of a plurality of load states of the on-premise infrastructure controller based on the first infrastructure condition, wherein each of the plurality of load states is associated with a load average range indicating a load from one or more infrastructure resources managed by the on-premise infrastructure controller;
maintain performance and response time of the on-premise infrastructure controller by adjusting an interval at which the polling is performed based on the first load state; and
adjust a consistency level of the on-premise infrastructure controller to a first level of the consistency based on the first load state.

12. The non-transitory machine-readable medium of claim 11, storing instructions which, when executed by a processor, cause the processor to:
receive second monitoring data indicating a second infrastructure condition occurring at the on-premise infrastructure controller;
determine a second load state of the plurality of load states of the on-premise infrastructure controller based on the second infrastructure condition; and
adjust a consistency level of the on-premise infrastructure controller to a second level of the consistency based on the second load state.

13. The non-transitory machine-readable medium of claim 11, wherein the infrastructure condition comprises at least one of load average, network latency, throughput and level of frequency of data changes.

14. The non-transitory machine-readable medium of claim 13, wherein the plurality of load states comprise low, medium high and critical states.

15. The non-transitory machine-readable medium of claim 14, storing instructions which, when executed by a processor, cause the processor to:
adjust a timeout interval to a first timeout interval based on the first load state; and
adjust the timeout interval to a second timeout interval based on the second load state.

16. The non-transitory machine-readable medium of claim 14, storing instructions which, when executed by a processor, cause the processor to transmit the consistency level to a client device.

17. The non-transitory machine-readable medium of claim 14, storing instructions which, when executed by a processor, cause the processor to:
adjust an aging algorithm associated with a retention period of historical records to a first aging algorithm based on the first load state; and
adjust the aging algorithm to a second aging algorithm based on the second load state.

18. A method to facilitate infrastructure management, comprising:
monitor resource service conditions at an on-premise infrastructure controller by polling the on-premise infrastructure controller;
receiving first monitoring data in response to the polling indicating a first infrastructure condition occurring at the on-premise infrastructure controller;
determining a first load state of a plurality of load states of the on-premise infrastructure controller based on the first infrastructure condition, wherein each of the plurality of load states is associated with a load average range indicating a load from one or more infrastructure resources managed by the on-premise infrastructure controller;
maintain performance and response time of the on-premise infrastructure controller by adjusting an interval at which the polling is performed based on the first load state; and
adjusting a consistency level of the on-premise infrastructure controller to a first level of the consistency based on the first load state.

19. The method of claim 18, wherein the infrastructure condition comprises a load average, and said determining a first load state comprises:
calculating a load percentage based on a received load average; and
comparing the load percentage to a state map to determine one of the plurality of load states associated with the load percentage.

20. The method of claim 19, further comprising:
adjusting a timeout interval to a first timeout interval based on the first load state; and
adjusting the timeout interval to a second timeout interval based on the second load state.

* * * * *